Dec. 27, 1927.
L. G. NILSON
BRAKE WINDING MECHANISM
Filed Aug. 15, 1922
1,654,089
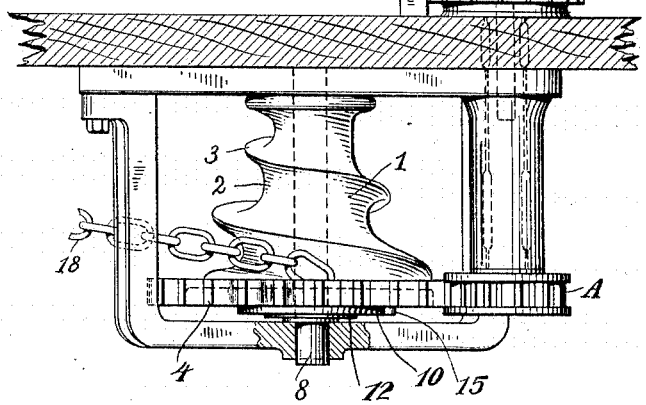
Fig. 1.
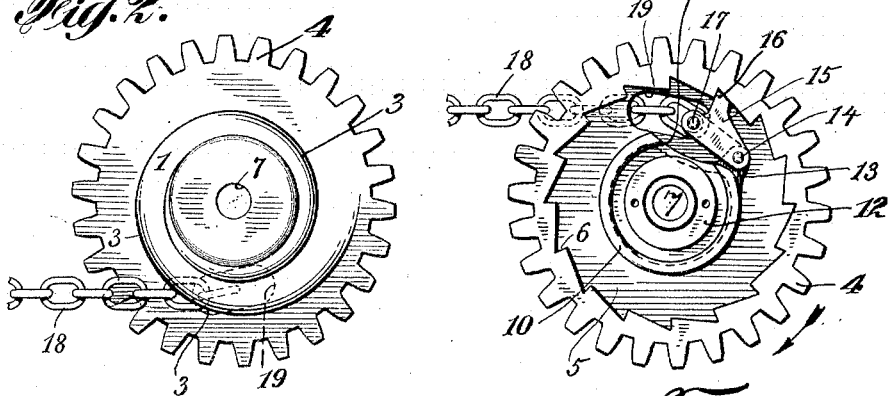
Fig. 2.
Fig. 3.
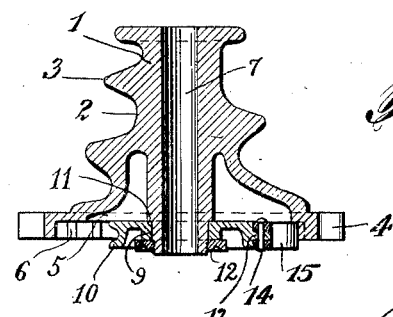
Fig. 4.
Inventor
Lars G. Nilson
By Featherstonhaugh & Co.
his Attorneys Patented Dec. 27, 1927.

1,654,089

UNITED STATES PATENT OFFICE.

LARS G. NILSON, OF HOBOKEN, NEW JERSEY, ASSIGNOR OF ONE-HALF TO FRANK P. FAHY, OF NEW ROCHELLE, NEW YORK.

BRAKE-WINDING MECHANISM.

Application filed August 15, 1922. Serial No. 582,090.

In hand operated brakes as applied to railway cars, it is customary to make the connection from the brake rigging proper on the trucks to the winding mechanism by means of a chain.

The common practice so far has been to fasten one end of this chain directly to the larger diameter end of a conoidal winding drum.

Inasmuch as brake shoes wear, it has been found necessary to provide considerably more winding space on the drum than for the length of chain needed by applying the brake shoes under normal conditions.

For example: In order to bring the brake shoes in contact with the wheels and take the slack out of the brake rigging, it may only require a take-up of 12″ on the chain.

With the brake shoes correctly adjusted, there will be very little slack in the chain, therefore a 12″ wind on the drum will apply the brakes, but as the brake shoes wear, more and more chain will have to be wound on the drum. For this reason winding drums sometimes provide a groove or space for taking up about 30″ of the chain, the end of the chain being bolted to the drum at the end of the groove. When the brake shoes wear the effective winding space of the drum is gradually transferred from the larger diameter to the smaller diameter end.

When releasing, only 12″ of chain is required to unwind for the purpose of having the brake shoes clear the wheels, but the momentum of the winding mechanism (when set free) will not only allow all the chain to unwind, but sometimes overrun (tending to wind up the chain in the opposite direction).

This makes subsequent brake applications slow and inefficient on account of the necessity of winding up a lot of slack chain before the brake levers start to move.

Various attempts have been made to provide means for limiting the unwinding of the chain from the drum, but such means have been more or less complicated and difficult to adjust, besides proving inefficient.

With a view to remedying the deficiencies in brake mechanism referred to I have devised means whereby the slack in flexible power members such as brake chains may be taken up without interfering with or in any way changing the effective or useful chain space on winding drums.

Other features and advantages of my invention will hereinafter appear.

In the drawings:—

Figure 1 is a side elevation of my improved winding device for brake chains.

Fig. 2 is a top plan view thereof.

Fig. 3 is a bottom plan view, and

Fig. 4 is a vertical section.

In the drawing I have shown one form of my improvement applied to the usual type of winding drum forming a part of the brake mechanism used with railway cars, the inventive feature herein disclosed consisting of certain auxiliary means whereby the slack in the chain which occurs as the result of wear in the parts may be conveniently taken up by or absorbed within the device itself.

Referring to the views, let 1 indicate a brake drum, having the general conoidal form shown, with the depressed seat 2 that takes a spiral path, flanked by the continuous flange 3; the seat having its maximum diameter near the drum base, and its minimum diameter near the upper portion of the drum.

The drum is provided with external gear teeth 4 for engagement with the pinion A of the usual brake staff B whereby the winding drum is rotated.

The drum is hollowed out at its base portion, as at 5, and is there provided with the internal ratchet teeth 6. Also the drum is provided with an axial aperture 7 to receive a spindle 8 upon which it can rotate.

A hub 9, concentric with aperture 7 affords a bearing for a revoluble member 10 that is located thereon between a shoulder 11 and a washer or nut 12 that is suitably secured to the lower end of hub 9.

The revoluble member 10 carries a radially extended lug 13, to which is pivoted, at 14, a pawl 15, whose tooth 16 is capable of engagement with the teeth 6. The tooth 16 is inclined rearwardly from the pivotal point 14 of pawl 15, and the pawl is provided at a rearward point, near its base, with a pin 17 or equivalent engaging means for the terminal link of a brake chain 18. The chain, which thus has its genesis at its point of connection with the pawl, extends out in the direction of the brake rigging through an aperture 19 provided therefor in the wall of the drum, from the hollowed out portion thereof. The aperture 19 communicates with the seat 2, near the beginning thereof in approximately the maximum diameter of the drum, so that the chain portion emerging through aperture 19 can lie snugly in its seat.

It will be noticed that the tooth 16 of the pawl 15, when engaged with a tooth 6, extends out right angularly to a straight line drawn through the pivot 14 and pin 17, and that consequently the draught upon the chain as the member 10 is turned in the direction of the arrow (Fig. 3) will urge the tooth 16 into sucessive spaces between teeth 6 as it slips past said teeth. This turning operation of member 10 is to be effected by finger pressure, for adjustment purposes.

A peripheral recess 20 in member 10 receives the pawl as it is depressed in passing teeth 6, also serving for the lodgement of the pawl when it is desired to release the chain.

It will be understood that by the use of my improved drum 1 the slack of the chain may be taken up or absorbed within the drum, leaving only such emerged chain length for wrapping around the drum in seat 2 as will serve the purposes of applying and releasing the brake shoes to the car wheels.

The drum being partially exposed at its under surface enables a mechanic to easily get at the member 10 to turn it and thus cause any unnecessary slack in the chain to be wound thereon, so that the chain winding mechanism can always be maintained at the highest point of efficiency.

It will be noted that while I have illustrated my invention as applicable to brakes, it is equally useful for other purposes where a flexible power member is to be wound upon a receiving member, and I do not intend to limit myself to the specific use herein shown.

Variations within the spirit and scope of my invention are equally comprehended by the foregoing disclosure.

I claim:—

1. The combination with a winding drum of freely revoluble internal ratchet means for taking up the slack in a flexible power member, said ratchet means having means of attachment for the flexible power member.

2. The combination with a winding drum and a flexible power member to be wound thereon, of an auxiliary freely revoluble member for taking up the slack in said flexible power member, means of attachment between said auxiliary member and flexible member and ratchet means for locking said auxiliary member when rotated to tauten the flexible member.

3. A brake drum having a recessed interior and provided with means of communication between the drum surface and interior and a ratchet controlled revoluble member journalled within the drum to take up the slack of a single line brake chain.

4. In a winding apparatus, in combination, a hollow drum having an outer seat and an aperture extending to its interior for the passage of a flexible power member, ratchet teeth arranged annularly upon the inner surface of the drum, a revoluble member journalled within the hollow drum to receive the slack of the flexible power member, and a pawl carried by said revoluble member to engage the ratchet teeth, the pawl having means of engagement with the flexible power member.

Signed at the borough of Manhattan, in the city, county and State of New York, this 14th day of August, 1922.

LARS G. NILSON.